United States Patent
Carriere et al.

(10) Patent No.: US 9,358,495 B2
(45) Date of Patent: Jun. 7, 2016

(54) METHOD OF PURIFICATION BY MEANS OF ADSORPTION WITH REGENERATION USING A GAS CONTAINING AN UNDESIRED COMPONENT IN THE PURIFIED GAS

(75) Inventors: Céline Carriere, Villemomble (FR); Christian Monereau, Montpellier (FR); Itziar Urrutia, Bilbao (ES)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 177 days.

(21) Appl. No.: 14/117,764

(22) PCT Filed: Apr. 20, 2012

(86) PCT No.: PCT/FR2012/050863
§ 371 (c)(1),
(2), (4) Date: Nov. 14, 2013

(87) PCT Pub. No.: WO2012/172223
PCT Pub. Date: Dec. 20, 2012

(65) Prior Publication Data
US 2014/0083294 A1  Mar. 27, 2014

(30) Foreign Application Priority Data
May 16, 2011 (FR) ...................... 11 54216

(51) Int. Cl.
*B01D 53/04* (2006.01)
*C01B 3/56* (2006.01)
(Continued)

(52) U.S. Cl.
CPC .......... *B01D 53/0462* (2013.01); *B01D 53/047* (2013.01); *C01B 3/56* (2013.01);
(Continued)

(58) Field of Classification Search
CPC ............ B01D 53/047; B01D 53/0462; B01D 2256/20; B01D 2257/102; B01D 2257/104; B01D 2257/504; B01D 2257/80; C01B 3/56; C01B 2203/043; C01B 2203/047; C01B 2203/048; C10K 1/26; Y02C 10/08
USPC ........................ 95/97–99, 104–106, 139, 148
See application file for complete search history.

(56) References Cited

U.S. PATENT DOCUMENTS 5,846,295 A * 12/1998 Kalbassi et al. ................ 95/105
5,897,686 A    4/1999 Golden et al.
(Continued)

FOREIGN PATENT DOCUMENTS

EP  0884275 A2  12/1998
EP  1458461 B1   1/2007
(Continued)

OTHER PUBLICATIONS

French Search Report and Written Opinion for corresponding FR 1154216, Dec. 22, 2011.
(Continued)

*Primary Examiner* — Frank Lawrence
(74) *Attorney, Agent, or Firm* — Elwood L. Haynes

(57) ABSTRACT

TSA method for purification by means of adsorption of a synthetic gas including hydrogen, CO and/or methane, implementing at least one adsorber having at least one adsorbent and subjected to a pressure cycle comprising at least an adsorption step, a step of producing a flow enriched with a main component and a regeneration step, characterized in that the regeneration step includes:
  regenerating the adsorbent using a regeneration gas including more than 95 mol of nitrogen; and
  scavenging the adsorbent using a scavenging gas corresponding to a fraction of the synthetic gas to be purified or a fraction of the purified synthetic gas.

7 Claims, 4 Drawing Sheets

(51) Int. Cl.
 *C10K 1/26* (2006.01)
 *B01D 53/047* (2006.01)
(52) U.S. Cl.
 CPC .............. *C10K 1/26* (2013.01); *B01D 2256/16* (2013.01); *B01D 2256/20* (2013.01); *B01D 2257/102* (2013.01); *B01D 2257/104* (2013.01); *B01D 2257/504* (2013.01); *B01D 2257/80* (2013.01); *C01B 2203/043* (2013.01); *C01B 2203/047* (2013.01); *C01B 2203/048* (2013.01); *Y02C 10/08* (2013.01); *Y02P 20/152* (2015.11)

(56) References Cited

U.S. PATENT DOCUMENTS

| | | | | |
|---|---|---|---|---|
| 2003/0221555 | A1* | 12/2003 | Golden et al. | 95/96 |
| 2004/0118279 | A1* | 6/2004 | Kalbassi et al. | 95/96 |
| 2005/0000354 | A1 | 1/2005 | Monereau | |
| 2005/0257566 | A1 | 11/2005 | De Sousa | |
| 2006/0199723 | A1 | 9/2006 | Lang | |
| 2010/0024641 | A1 | 2/2010 | Monereau et al. | |

FOREIGN PATENT DOCUMENTS

| | | |
|---|---|---|
| EP | 2216292 A1 | 8/2010 |
| FR | 2836060 A1 | 8/2003 |
| FR | 2911289 A1 | 7/2008 |
| FR | 2917304 A1 | 12/2008 |

OTHER PUBLICATIONS

International Search Report and Written Opinion for corresponding PCT/FR2012/050863, Jul. 20, 2012.

* cited by examiner 2.a 2.b 3.a 3.b

METHOD OF PURIFICATION BY MEANS OF ADSORPTION WITH REGENERATION USING A GAS CONTAINING AN UNDESIRED COMPONENT IN THE PURIFIED GAS

CROSS REFERENCE TO RELATED APPLICATIONS

This application is a 371 of International Application PCT/FR2012/050863, filed Apr. 20, 2012, which claims priority to French Application No. 1154216, filed May 16, 2011, the entire contents of which are incorporated herein by reference.

BACKGROUND

This invention relates to a method of purification by means of adsorption wherein the adsorbent is cyclically regenerated, in particular a method of the TSA (Temperature Swing Adsorption) type wherein a gaseous mixture comprising at least one main component and at least one impurity is at least partially purified.

Conventionally, a cycle of the TSA method comprises the following steps:
a) purifying the air via adsorption of the impurities at super-atmospheric pressure and at ambient temperature,
b) depressurising the adsorber to atmospheric pressure,
c) regenerating the adsorbent at atmospheric pressure, in particular via the waste gases, typically impure nitrogen coming from an air separation unit and heated to a temperature usually between 100 and 250° C. using one or several heat exchangers,
d) cooling to ambient temperature of the adsorbent, in particular by continuing to introduce said waste gas therein coming from the air separation unit, but not heated, and
e) repressurising the adsorber with purified air coming, for example, from another adsorber in production phase.

It is known to regenerate the adsorbent with a gas that is different from the gas to be treated.

By way of example, U.S. Pat. No. 5,897,686 discloses the drying and the decarbonation of a H2/CO mixture by an inert, in particular nitrogen. The adsorber is then repressurised and put back into production.

However in certain cases, certain compounds even inert can be troublesome in the gas produced and must be excluded or remain under a given threshold so that the gas produced can be used industrially.

The final purification of so-called ultra-pure gases can be mentioned which must contain impurities only at the ppm, or even ppb level or even less.

This is also the case for certain applications of H2/CO mixtures or more generally of synthetic gas.

More particularly, the gaseous mixture is a synthetic gas including hydrogen, CO, possibly methane, nitrogen, argon, oxygen and the main impurities are part of the water group, methanol, CO2 with possibly NH3, HCN, traces of C2+ etc. hydrocarbons.

The purified gas is intended to be separated into fractions enriched with H2 and/or CO for example in a cryogenic unit or to be sent according to determined H2/CO ratios to downstream units.

As indicated, the synthetic gas can contain components in small quantities such as N2 or Ar that come either from natural gas or from coal used as a raw material, or from the oxygen used as an oxidant in the preparation of the synthetic gas, or from inlet air or from inert gas in the supply gas during its treatment.

These gases generally behave as inert gases, sometimes as poisons, according to the use which is made of the products resulting from the synthetic gas.

Their content can therefore be limited by specifications whether in the hydrogen, CO or H2/CO mixtures intended for diverse syntheses (oxo-alcohol, methanol, etc.).

These limitations can range from a few ppm to a few mol %, for example a few thousand ppm in hydrogen intended for refineries, 3% for certain syntheses.

A separation of these gases is possible but is generally expensive.

A solution, in the case of purifying synthetic gas, is to use a regeneration with hydrogen in order to prevent introducing other components, in particular nitrogen. However, this solution requires the regeneration gas to be recycled in order to avoid losing it.

As such, a problem that arises is to improve the purification methods having a regeneration with a gas containing an undesirable component, which would lead to introducing an excessive quantity of this undesirable component in the purified gas.

SUMMARY

A solution of this invention is a purification method via adsorption of a gaseous mixture including a main component and an impurity, implementing at least one adsorber having at least one adsorbent and subjected to a pressure cycle comprising at least an adsorption step, a step of producing a flow enriched with a main component and a regeneration step, characterised in that the regeneration step comprises:
  regenerating the adsorbent using a regeneration gas containing an "undesired" component with a content at least 10 times greater than the permissible content of this "undesired" component in the flow enriched with a main component; and
  scavenging the adsorbent using a scavenging gas in such a way as to eliminate from the adsorbent at least a portion of the "undesired" component.

"Undesired" component means an undesired component in the purified flow, in other words undesired in the flow enriched with a main component.

By definition the scavenging gas is not mixed, at the output of the adsorber, with the gaseous mixture to be purified or with the flow enriched with a main component since it will exit enriched with an "undesired" component.

In order to comply with this maximum concentration, a solution is to adjust the quantity of scavenging gas by controlling the flow of the scavenging gas and/or the duration of the scavenging.

According to the case the method according to the invention can have one or several of the following characteristics:
  the regeneration gas comprises a secondary component with a content greater than or equal to 50 mol % and the permissible content of said secondary component in the flow enriched with a main component is less than or equal to 5 mol %;
  the flow of the scavenging gas and/or the duration of the scavenging is adjusted in such a way as to eliminate from the adsorbent at least a portion of the "undesired" component which must have a concentration less than or equal to 5 mol % in the flow enriched with a main component;
  the adsorber operates continuously;
  the adsorption is carried out at a first pressure P1; regeneration is carried out at a second pressure P2 less than P1; and the scavenging is carried out at a third pressure P3 less than P1, preferably equal or less than P2;

the scavenging gas is chosen from among the gaseous mixture to be treated or the flow enriched with a main component;

the regeneration gas includes at least 50% of a component that is less adsorbable on the adsorbent than one of the main components of the scavenging gas;

the regeneration gas mostly contains nitrogen and the scavenging gas contains methane and/or CO and/or ethane;

the gaseous mixture to be treated is synthetic gas including hydrogen, CO and/or methane, the regeneration gas is more than 95 mol % of nitrogen and the scavenging gas is synthetic gas, preferably purified synthetic gas;

the gaseous mixture to be treated is a synthetic gas coming from a low temperature methanol wash method, the regeneration gas mostly contains nitrogen and the scavenging gas corresponds to a fraction of the gaseous mixture to be purified;

said method is a TSA method and the scavenging is carried out after the heating phase or the cooling phase;

said method is a TSA method comprising steps of depressurising and of repressurising, with the step of repressurising implementing a repressurising circuit and the scavenging being carried out by the repressurising circuit.

Conventionally, the steps of depressurising and of repressurising are located respectively after and before the production phase.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 1.*b* illustrates one embodiment of the present invention;

FIG. 2.*b* illustrates one embodiment of the present invention;

FIG. 3.*b* illustrates one embodiment of the present invention; and

FIG. 3.*c* illustrates one embodiment of the present invention.

DESCRIPTION OF PREFERRED EMBODIMENTS

The invention shall now be described in more detail using FIGS. 1 to 3.

Figure 1:
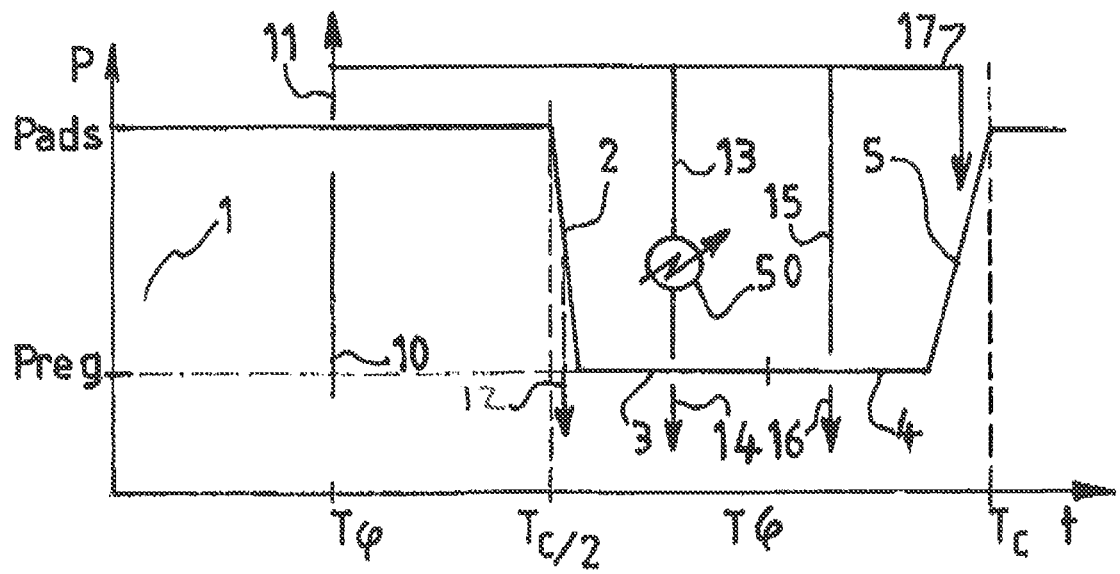
FIG. 1.*a* illustrates one embodiment of the present invention.
Figure 1:
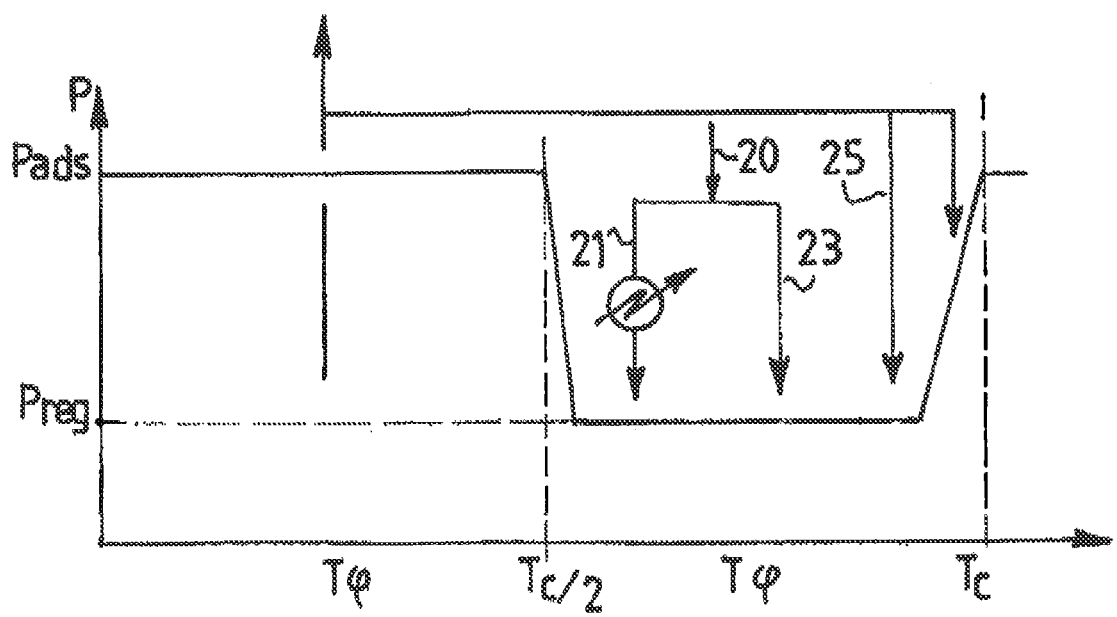

FIG. 1 diagrammatically shows a unit for drying and decarbonating syngas intended to be fractionated in a cold box located just downstream. The purification is carried out using an adsorption unit of the TSA type generally comprised of two adsorbers. In the simplest configuration shown in FIG. 1.*a*, an adsorber is in production phase (of adsorption of impurities) while the other is regenerated. The duration of the complete cycle is shown for one of the two adsorbers. With the cycle time being Tc, there is a production phase with a duration Tf=Tc/2 and a regeneration phase of equal duration.

The second adsorber follows the same cycle with a phase time shift. As such, there is always a bottle in production.

The adsorption pressure Pads is generally between 15 and 70 bar abs, and the regeneration pressure can be between, according to the type of method, the adsorption pressure and atmospheric pressure.

In the example relating to FIG. 1, the case of a regeneration pressure substantially less than the adsorption pressure has been retained. We therefore have the following steps: 1 adsorption, 2 depressurising, 3 heating, 4 cooling and 5 repressurising. The adsorber then restarts an adsorption step. Note that there can be several other sub-steps of short duration (a few seconds to a maximum of a few minutes) corresponding to time for manoeuvring valves, verifications of the position of the valves, etc. which do not modify the principle of the cycle.

Note that in TSAs implemented in the last few years, the phases of heating and of cooling are not entirely separate because at the start of "cooling", the gas pushes the heat front into the adsorbent bed and therefore locally continues the phase of heating and of regenerating a portion of the adsorbent. It is often agreed to say that the heating phase is stopped when heating of the regeneration gas is stopped. The end of cooling is generally defined by the moment when the regeneration gas at the output of the bed—or at the adsorber output according to the position of the temperature sensor—reaches an objective value, for example 15° C. hotter than the regeneration gas at the adsorber inlet or according to another criterion 10° C. hotter for example than the temperature of the gas to be purified. This temperature delta depends on the operating conditions and performance sought. It will generally be between 1 and 30° C. Note that it is possible in certain cases to not cool at all after heating before starting an adsorption phase. All of the gas to be purified is then sent through a hot adsorbent and it is the gas to be treated itself that cools the adsorbent. For this, the heat front must advance faster than the impurity front. This can be the case if it is sought to stop traces of a compound that is adsorbed very easily.

The duration after which an adsorber returns to the state that it had at the start is generally called the cycle time. The phase time corresponds to the cycle time divided by the number of adsorbers used in the method. Here, the most frequent case is described corresponding to 2 adsorbers but 3 or 4 adsorbers could also be used if necessary without leaving the scope of the invention.

In FIG. 1.*a*, the gas to be treated 10 is dried and decarbonated in the adsorber in order to give the purified gas 11. The gas 12 comes from the depressurising of the adsorber to the regeneration pressure. Heating is carried out by a fraction of the purified gas 13 heated in the heater 50 before being introduced into the adsorber. When the quantity of heat introduced is sufficient to desorb the impurities, the heater is stopped or bypassed and the fraction 15 of the purified gas makes it possible to cool the adsorbent. A last fraction of this gas 17 is used to repressurise the adsorber to high pressure.

The fractions 12, 14 and 16 contain the impurities but substantially synthetic gas. In order to prevent these gases from being lost, these fractions are either generally recycled in the synthetic gas upstream of a first purification unit (washing with a solvent for example), or used in a method that tolerates these impurities. Where applicable, these fractions can be used as combustion gases.

FIG. 1.*b* corresponds to the invention. The regeneration gas 20 is nitrogen which is used both for heating (fraction 21) and cooling (fraction 23). Note that in the scope of the invention, the heating gas and the cooling gas are generally the same gas but can possibly be different, with the heating gas then normally referred to as regeneration gas while the cooling can be carried out for example by the purified gas or the gas to be treated. In this case, the cooling is carried out preferentially at adsorption pressure. This step is followed by an additional step of low pressure scavenging using a fraction of the purified synthetic gas.

It is important to note that for the adsorbents usually used (in particular for the zeolite to stop the CO2), carbon monoxide CO is adsorbed preferentially to the nitrogen and that it therefore displaces this component, i.e. the CO is adsorbed and desorbs the nitrogen that was retained in the adsorbent. This therefore helps to remove the nitrogen while limiting the losses of CO which is often the compound with the most value.

The regeneration nitrogen is generally flared off except when a particular application has been found for it. This point will be covered later. It is not a priori recycled in the method since it is sought on the contrary to eliminate it from the synthetic gas.

The quantity of gas sent during this step of scavenging can be optimised in such a way that the specification in nitrogen, or more generally in neutral gas, is just reached in the purified gas.

For this type of application, the limit in N2 will range for example from a few hundred ppm to a few mol %.

In most cases, the duration of the scavenging will be less than 30 minutes, preferably less than 15 minutes and the flow (17) taken on the purified gas will represent less than 10% of this flow, and will preferentially be of a magnitude of 5%.

Expressed in relation to cycle time, the duration of the scavenging will be preferentially less than 10% and more preferentially a maximum of 5%.

If for any reason the regeneration pressure is substantially greater than atmospheric pressure, supposing for example between 4 and 10 bar abs, it can be interesting to carry out the scavenging at a lower pressure, close to atmospheric pressure.

Figure 2:
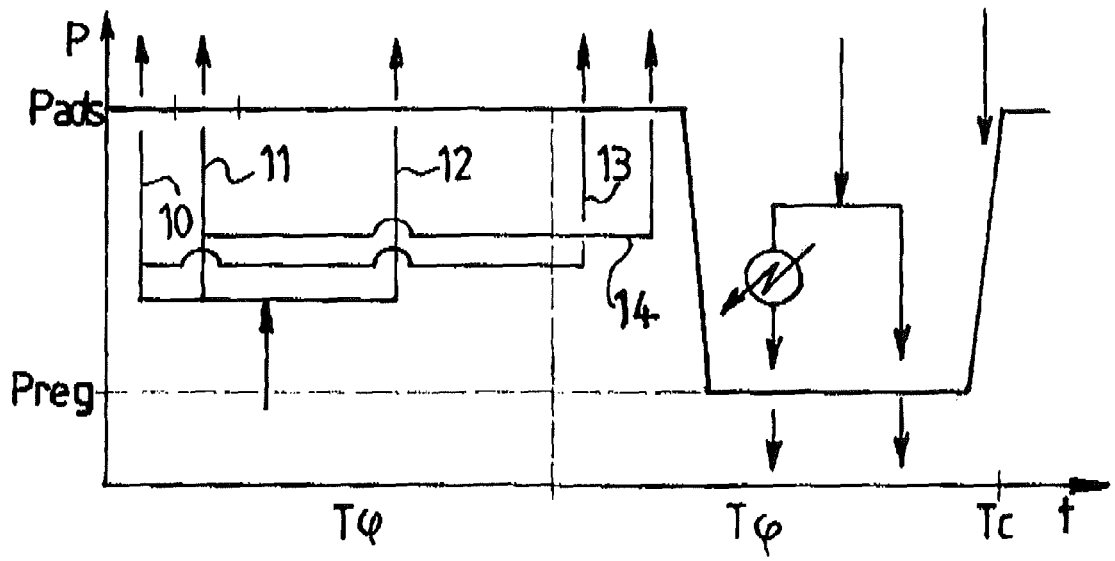
FIG. 2.*a* illustrates one embodiment of the present invention.
Figure 2:
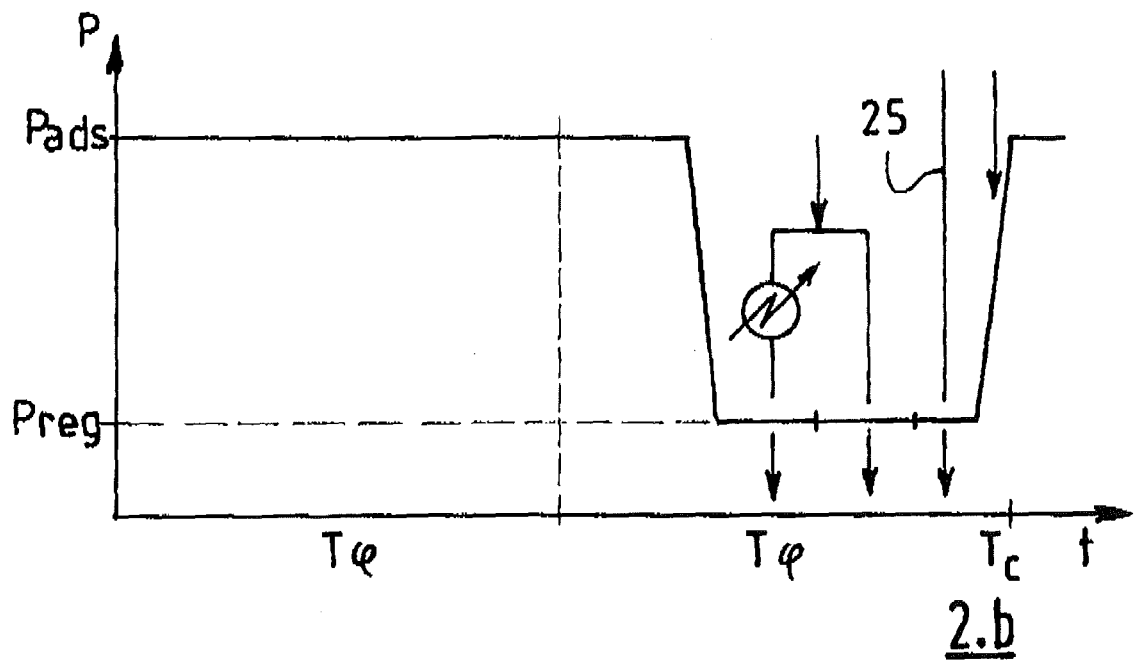

FIG. 2 shows a cycle of the same family described in patent EP 1 458 461.

In relation to the aforementioned, this cycle incorporates steps wherein the two adsorbers are simultaneously in production.

FIG. 2.*a* shows the basic drawing and FIG. 2.*b* corresponds to the invention with the addition of the flow 25 which makes it possible to flush at least one portion of the nitrogen from the adsorbent.

The adsorber that has just been regenerated only receives for a certain time a fraction—10—of the flow of gas to be purified, generally from 5 to 15%; the other fraction—13— (85 to 95%) is sent to the other adsorber still in purification. Generally this step is followed by a step during which the 2 adsorbers operate in parallel (flux 11 and 14). These steps which were not originally designed to decrease the nitrogen content in the purified gas but to limit the variations in CO content and in temperature also play a favourable role with regards to the nitrogen and make it possible to limit to the maximum the aforementioned scavenging. They can therefore advantageously be used together with said scavenging.

If the problem linked to the nitrogen is more of a peak problem than quantity and/or if the consequences of a nitrogen peak are very substantial for the downstream method, it is furthermore possible to install on the purified gas an adsorber that plays the role of a limiter or a delayer.

Note that it is not necessary for the fluid 25 to be purified gas to be treated. According to the industrial context, a certain number of flows can be suitable as long as they are substantially dry and exempt of CO2. This can be in the case of the cryogenic fractioning of the synthetic gas, a gas of varied composition coming from the cold box. These gases will generally contain H2, CO, CH4 and be available at varied pressures.

In other contexts, this can be an H2/CO mixture for which a more or less substantial N2 content does not have a considerable effect.

Figure 3:
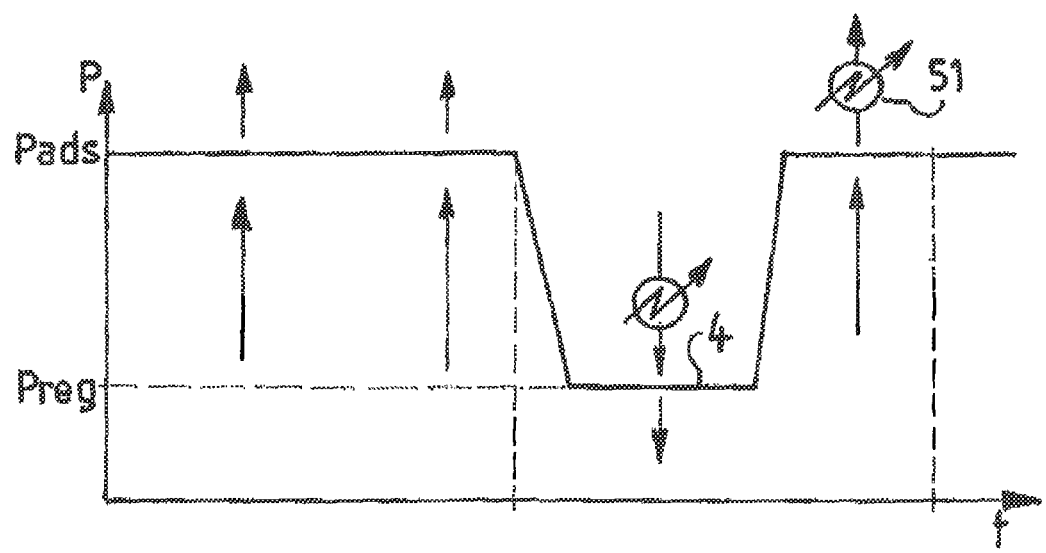
FIG. 3.*a* illustrates one embodiment of the present invention.
Figure 3:
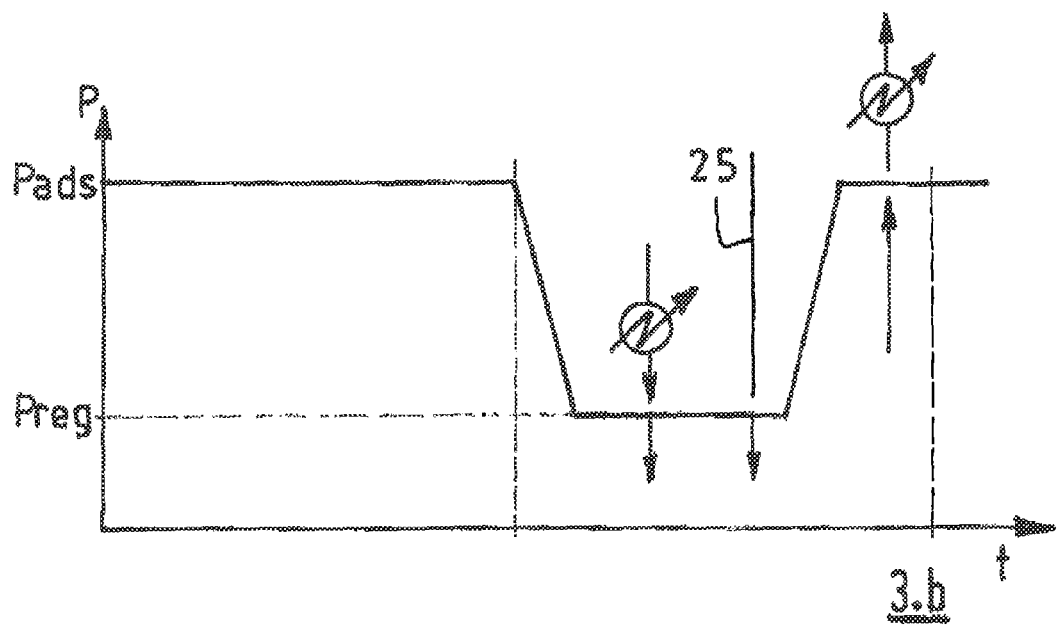
Figure 3:
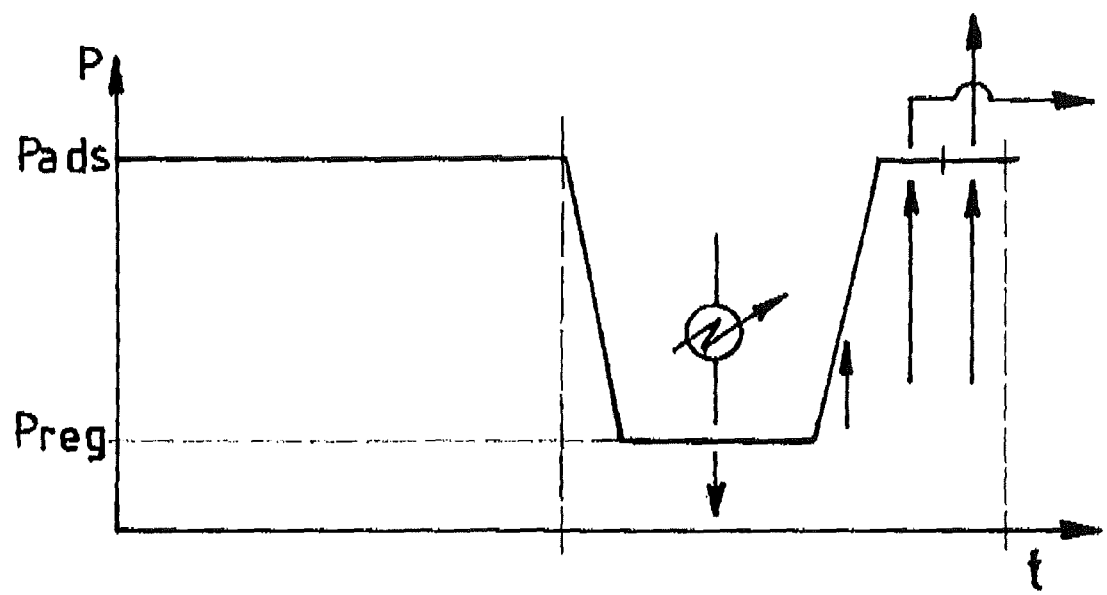

FIG. 3 corresponds to a cycle that does not have a step of cooling properly speaking.

The step of heating 4 is immediately followed by a step of repressurising (the case here is where the regeneration pressure—heating—is less than the adsorption pressure, which is not necessarily the case). The cooling of the adsorbent is carried out directly by the gas to be treated. The hot gas at the output may be cooled if required via the exchanger 51.

The cycle according to FIG. 3.*b*, corresponding to the invention, comprises the additional step of scavenging the adsorber via a gas that is exempt or poor in N2. It will be noted that the adsorber is then partially hot and that this scavenging constitutes a portion of the cooling step.

FIG. 3.*c* shows an alternative for which the scavenging intended to remove the nitrogen is carried out at high pressure, with the gas produced as long as it is not at the specification not being used. Coupled with the principles developed in FIG. 2, the flow of gas to be treated used can represent only a fraction of the total flow.

This diagram with regeneration with nitrogen followed by a scavenging with a gas poor or exempt of nitrogen is particularly well suited when upstream of the purification the synthetic gas has undergone a first purification using a solvent. Indeed, this type of washing can require a step of stripping the washing liquid in order to extract therefrom a certain number of impurities. It is common to use a flow of nitrogen at low or average pressure (<10 bar abs) for this purpose. This fraction N2, all or partially, can be used in order to regenerate the purification before sending it to the washing unit.

An example according to the invention is the case wherein the synthetic gas comes from a low temperature methanol washing method; method including a step of regenerating the washing liquid via stripping with nitrogen. This flow, entirely or partially, is used beforehand in order to regenerate the adsorbent used to retain the traces of methanol, the residual CO2 and possibly the traces of C2+ hydrocarbons, of NOx. This purification via adsorption is generally carried out at low temperature, at the output temperature of the washing column with methanol, generally from −30 to −70° C. The heating is carried out according to the invention with the nitrogen brought to a temperature between 100 and 220° C., generally between 150 and 200° C. The nitrogen is also generally used to cool the adsorbent to ambient temperature. The final cooling is carried out generally using the gas to be treated. The synthetic gas purified as such is then treated in a cold box in order to produce a CO fraction. As the nitrogen is then in the CO production—unless expensive and energy-consuming equipment is added—it is very interesting, according to the invention to carry out a scavenging with the gas to be treated expanded in such a way as to remove most of the nitrogen adsorbed and contained in the dead volumes of the adsorber. The possible residual nitrogen is then desorbed during the cooling with a fraction of the gas to be treated. In light of the previous scavenging, this flow can be mixed with the other fraction of the purified gas without exceeding the maximum value for the nitrogen content.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A TSA method for purifying through adsorption of a synthetic gas including hydrogen, CO and/or methane, utilizing at least one adsorber having at least one adsorbent and subjected to a pressure cycle comprising at least an adsorption step, a step of producing a flow enriched with a main component and a regeneration step, wherein the regeneration step includes:
   regenerating the adsorbent using a regeneration gas including more than 95 mol % of nitrogen; and
   scavenging the adsorbent using a scavenging gas corresponding to a fraction of the synthetic gas to be purified or a fraction of the purified synthetic gas.

2. The method of claim 1, wherein the flow of the scavenging gas and/or the duration of the scavenging are adjusted in such a way as to remove from the adsorbent at least a portion of the nitrogen which must have a concentration less than or equal to 5 mol % in the purified synthetic gas.

3. The method of claim 1, wherein the adsorber operates continuously.

4. The method of claim 1, wherein:
   the adsorption is carried out at a first pressure P1;
   the regenerating is carried out at a second pressure P2 less than P1; and
   the scavenging is carried out at a third pressure P3 less than P1.

5. The method of claim 1, wherein the gaseous mixture to be treated is a synthetic gas coming from a low temperature methanol washing method.

6. The method of claim 1, wherein the scavenging is carried out after a heating phase or a cooling phase.

7. The method of claim 1, wherein said method is a TSA method comprising steps of depressurizing and of repressurizing, with the step of repressurizing implementing a repressurizing circuit and the scavenging being carried out by the repressurizing circuit.

* * * * *